March 28, 1933. J. H. BROWNE 1,903,025
TIRE REPAIR VULCANIZER
Filed July 10, 1931 2 Sheets-Sheet 1
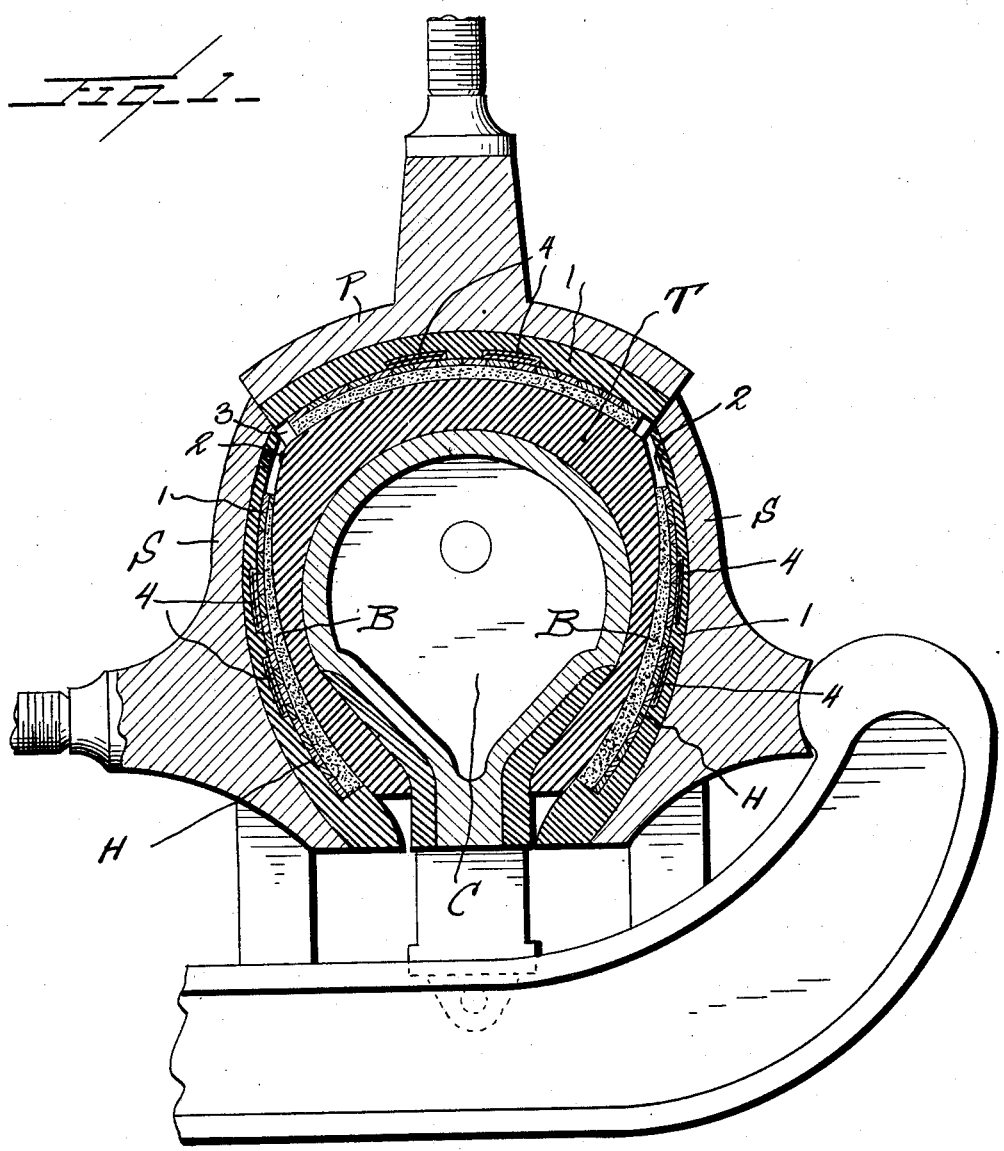
Inventor
J. H. Browne
By Watson E. Coleman
Attorney March 28, 1933. J. H. BROWNE 1,903,025
TIRE REPAIR VULCANIZER
Filed July 10, 1931 2 Sheets-Sheet 2
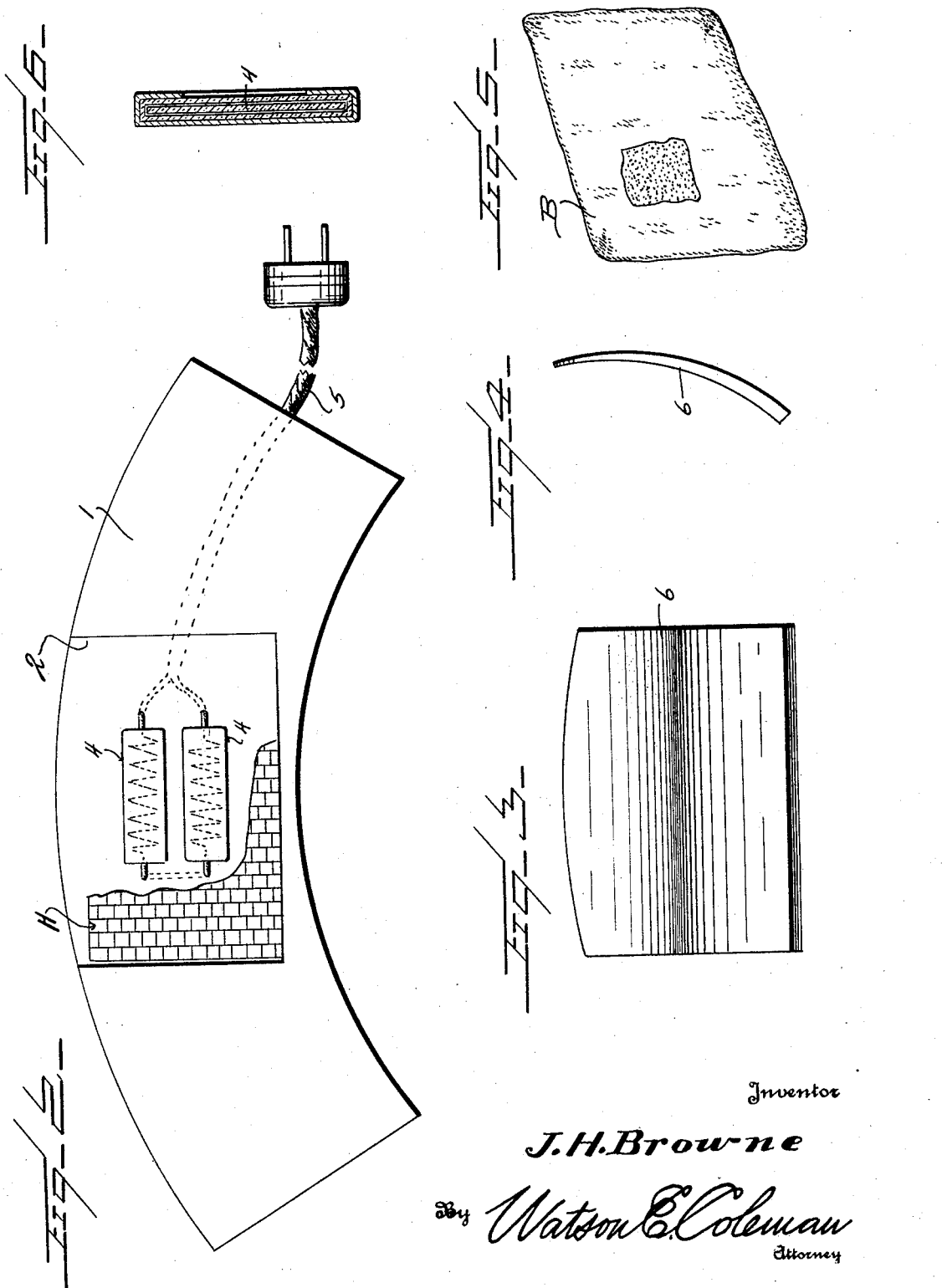

Patented Mar. 28, 1933

1,903,025

UNITED STATES PATENT OFFICE

JAMES H. BROWNE, OF EAST LIVERPOOL, OHIO

TIRE REPAIR VULCANIZER

Application filed July 10, 1931. Serial No. 550,031.

This invention relates to tire repair vulcanizers and especially to such vulcanizers of a type employing pressure plates to engage a tire from without, and primarily it is an object of the invention to provide such plate or plates with means whereby external heat may be readily and conveniently applied to the tire being vulcanized.

The invention also has for an object to provide a pressure plate of a vulcanizer with means whereby a heating pad may be employed to apply external heat to a tire being vulcanized and wherein the plate is provided with means for transmitting the desired heat to the pad when the pad is in applied position with respect to the pressure plate.

An additional object of the invention is to provide an exterior pressure plate in a vulcanizer having a cushion disposed over its inner face, such cushion being provided with a pocket in which is adapted to be placed a heating pad, together with means for heating the pad when within said pocket and, furthermore, wherein said pad is entirely separate from the cushion so that the pad may be readily applied or removed as desired.

The invention consists in the details of construction and in the combination and arrangement of the several parts of my improved tire repair vulcanizer whereby certain important advantages are attained and the device rendered simpler, less expensive and otherwise more convenient and advantageous for use, as will be hereinafter more fully set forth.

The novel features of my invention will hereinafter be definitely claimed. In order that my invention may be the better understood, I will now proceed to describe the same with reference to the accompanying drawings, wherein:—

Figure 1 is a fragmentary view partly in cross section and partly in elevation illustrating a vulcanizer having external pressure plates constructed in accordance with an embodiment of my invention and in applied position with respect to a tire casing;

Figure 2 is a view somewhat of a diagrammatic character viewing from the inside one of the external pressure plates as herein disclosed;

Figure 3 is a view in side elevation of a cushion section to fill the pocket or chamber within the cushion of the pressure plate when the heating pad is not in use;

Figure 4 is a view in end elevation of the pad illustrated in Figure 3;

Figure 5 is a view in perspective with a portion broken away of a sand bag to be used in connection with my improved plates;

Figure 6 is a transverse sectional view taken through one of the heating units as herein employed.

As disclosed in the accompanying drawings, C denotes a steam core of a tire repair vulcanizer which is adapted to be snugly engaged within that portion of the tire casing T to be repaired. This core C is supported in working position in any desired manner and adapted for co-action with the tire casing T as applied upon the core C are the exterior side pressure plates S and the top pressure plate P. Any desired means may be employed in connection with these plates to cause the same to have requisite pressure upon the portion of the tire casing T applied to the core C.

Carried by each of the plates S and P and disposed over the inner face thereof is a resilient or deformable cushion 1 of vulcanized rubber or other desired material, and the central portion of each of these cushions associated with a side plate S is provided with a relatively long pocket or chamber 2 having a longitudinal side or margin thereof open at the outer marginal portion of the plate S. The cushion 1 of the top plate P is also provided with a centrally disposed pocket or chamber 3 of a length substantially the same as that of a pocket or chamber 2, said pocket or chamber 3 extending entirely across the cushion 1 of the plate P and open at the side sides or margins of the plate P.

Embedded within the base portion of each of the pockets or chambers 2 and 3 are a plurality of heating units 4 of electrical type and herein disclosed as connected in series and adapted to be coupled to the cable 5 with any desired source of electrical energy.

Each of these heating units 4 comprises an outer casing 6 substantially enclosing the heating unit proper, said casing presenting an exposed and substantially flat surface at the base face or wall of a pocket or chamber 2 or 3. Each of the pockets or chambers 2 or 3 is adapted to receive and house a flexible heating pad H made of heat conductive material and of a type to readily flex in substantially all directions so that such pad when in use will readily conform to the surface of the tire casing T with which it is used. When the pad H is applied within a pocket or chamber 2 or 3 and with the operating current for the associated units 4 closed, the heat generated by such units will be transmitted to the applied pad H and to such a degree whereby in the vulcanizing operation effective external heat may be applied to the tire casing T and thus materially facilitate the vulcanizing operation.

To prevent the pad H from burning, scorching or otherwise marring the tire casing T it is of advantage to employ a sand bag B of desired dimensions which is readily received within a pocket or chamber 2 or 3 after the pad H has been applied and during a working operation, as is illustrated in Figure 1, this sand bag B is interposed between the tire casing T and the heating pad H.

By having the pocket or chamber 3 in the top plate P open at both sides of such plate and by having the pockets or chambers 2 of the side plates S open at the outer or upper margins of such plates, if desired a pad H may be applied within adjacent end portions of pockets or chambers 2 and 3 and in contact with heating units in each of such pockets or chambers whereby it is possible to apply external heat to a tire casing T at substantially any point therealong and more especially between adjacent plates S and P.

When the heating means of any one of the plates S and P is not to be used, the pocket or chamber 2 or 3 of such plate is adapted to be filled by a cushion section 7 whereby the exposed surface of the cushion, or that surface thereof for contact with the tire casing T, will be substantially unbroken thus assuring the pressure plate being used with a maximum of efficiency.

From the foregoing description it is thought to be obvious that a tire repair vulcanizer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. As a new article of manufacture, a deformable cushion adapted to be disposed over the inner face of the pressure plate of a vulcanizer, said cushion being provided with a pocket, a potential heating means carried by the cushion and arranged at the base of the pocket, a flexible heating pad made of heat conductive material arranged within the pocket and having portions directly contacting with the potential heating means.

2. As a new article of manufacture, a deformable cushion adapted to be disposed over the inner face of the pressure plate of a vulcanizer, said cushion being provided with a pocket, a potential heating means carried by the cushion and arranged at the base of the pocket, a flexible heating pad made of heat conductive material arranged within the pocket and having portions directly contacting with the potential heating means, and a sand bag placeable within the pocket and overlying the pad.

3. As a new article of manufacture, a deformable cushion adapted to be disposed over the inner face of the pressure plate of a vulcanizer, said cushion being provided with a pocket, a potential heating means carried by pocket, a potential heating means carried by the cushion and arranged at the base of the pocket, a flexible heating pad made of heat conductive material arranged within the pocket and having portions directly contacting with the potential heating means, said pocket opening through a marginal portion of the cushion.

4. A vulcanizer comprising separate tread and side pressure plates having yielding pressure faces, pockets in said pressure faces having adjacent marginal portions open, and a separable flexible heating pad for placement within each of said pockets or in adjacent pockets.

5. As a new article of manufacture, a deformable cushion adapted to be disposed over the inner face of the pressure plate of a vulcanizer, said cushion being provided with a pocket, a potential heating means carried by the cushion and arranged at the base of the pocket, a separable flexible heating pad made of heat conductive material arranged within the pocket and having portions directly contacting with the potential heating means.

In testimony whereof I hereunto affix my signature.

JAMES H. BROWNE.